(12) United States Patent
Sanders

(10) Patent No.: US 9,961,922 B2
(45) Date of Patent: May 8, 2018

(54) ANIMAL FEED AND/OR WATER AMENDMENTS FOR LOWERING AMMONIA CONCENTRATIONS IN ANIMAL EXCREMENT

(71) Applicant: Verdesian Life Sciences, LLC, Cary, NC (US)

(72) Inventor: John Larry Sanders, Leawood, KS (US)

(73) Assignee: Verdesian Life Sciences, LLC, Cary, NC (US)

( * ) Notice: Subject to any disclaimer, the term of this patent is extended or adjusted under 35 U.S.C. 154(b) by 896 days.

(21) Appl. No.: 14/049,887

(22) Filed: Oct. 9, 2013

(65) Prior Publication Data
US 2014/0106024 A1 Apr. 17, 2014

Related U.S. Application Data

(63) Continuation-in-part of application No. 13/791,263, filed on Mar. 8, 2013, now abandoned.

(60) Provisional application No. 61/713,757, filed on Oct. 15, 2012.

(51) Int. Cl.

| | | |
|---|---|---|
| *A23K 1/175* | (2006.01) | |
| *A23K 1/18* | (2006.01) | |
| *A23K 1/14* | (2006.01) | |
| *A23K 20/121* | (2016.01) | |
| *A23K 10/30* | (2016.01) | |
| *A23K 20/105* | (2016.01) | |
| *A23K 20/10* | (2016.01) | |
| *A23K 20/20* | (2016.01) | |
| *A23K 20/22* | (2016.01) | |
| *A23K 20/24* | (2016.01) | |
| *A23K 50/10* | (2016.01) | |
| *A23K 50/75* | (2016.01) | |
| *A23K 50/60* | (2016.01) | |

(52) U.S. Cl.
CPC ............ *A23K 20/121* (2016.05); *A23K 10/30* (2016.05); *A23K 20/10* (2016.05); *A23K 20/105* (2016.05); *A23K 20/20* (2016.05); *A23K 20/22* (2016.05); *A23K 20/24* (2016.05); *A23K 20/30* (2016.05); *A23K 50/10* (2016.05); *A23K 50/60* (2016.05); *A23K 50/75* (2016.05)

(58) Field of Classification Search
CPC ...... A23K 1/175; A23K 1/1853; A23K 20/20; A23K 20/105; A23K 50/75; A23K 20/24; A23K 50/60
USPC .............................................. 426/2, 66, 623
See application file for complete search history.

(56) References Cited

U.S. PATENT DOCUMENTS

| | | |
|---|---|---|
| 2,618,547 A | 1/1950 | Davenport et al. |
| 2,616,849 A | 11/1952 | Giammaria |
| 2,616,853 A | 11/1952 | Giammaria |
| 2,625,471 A | 1/1953 | Mowry et al. |
| 2,625,529 A | 1/1953 | Hedrick et al. |
| 2,976,138 A | 3/1961 | Hester |
| 3,052,648 A | 9/1962 | Bauer |
| 3,087,893 A | 4/1963 | Agius et al. |
| 3,130,033 A | 4/1964 | Stephens |
| 3,222,282 A | 12/1965 | Berkowitz et al. |
| 3,262,919 A | 7/1966 | Bolgiono |
| 3,308,067 A | 3/1967 | Diehl |
| 3,497,334 A | 2/1970 | Gee et al. |
| 3,634,052 A | 1/1972 | Gee et al. |
| 3,639,242 A | 2/1972 | Le Suer |
| 3,685,998 A | 8/1972 | Miller |
| 3,720,765 A | 3/1973 | Miller |
| 3,796,559 A | 3/1974 | Windgassen |
| 3,873,487 A | 3/1975 | Minato et al. |
| 3,936,427 A | 2/1976 | Viout et al. |
| 3,953,191 A | 4/1976 | Barton |
| 3,996,134 A | 12/1976 | Osborn et al. |
| 3,997,319 A | 12/1976 | Ott |
| 4,007,029 A | 2/1977 | Kenton |
| 4,010,006 A | 3/1977 | Price |
| 4,071,400 A | 1/1978 | Jankowiak |
| 4,076,663 A | 2/1978 | Masuda et al. |
| 4,082,533 A | 4/1978 | Wittenbrook et al. |
| 4,083,835 A | 4/1978 | Pohlemann et al. |
| 4,135,887 A | 1/1979 | Rossi |
| 4,161,539 A * | 7/1979 | Stallcup ............... A23K 20/105 514/574 |
| 4,165,743 A | 8/1979 | Denning |
| 4,173,669 A | 11/1979 | Ashida et al. |
| 4,211,765 A | 7/1980 | Johnson et al. |
| 4,251,255 A | 2/1981 | Wagner et al. |
| 4,434,231 A | 2/1984 | Jung |
| 4,439,488 A | 3/1984 | Trimnell et al. |
| 4,451,628 A | 5/1984 | Dammann |

FOREIGN PATENT DOCUMENTS

| | | |
|---|---|---|
| CN | 1044025 A | 7/1990 |
| CN | 1149239 A | 5/1997 |
| CN | 1962565 A | 5/2007 |
| CN | 101423431 A | 5/2009 |
| CN | 101519324 A | 9/2009 |

(Continued)

OTHER PUBLICATIONS

"Sodium Lignosulphonate". Available online at www.xyd-chem.com on Apr. 20, 2010.*

(Continued)

*Primary Examiner* — Michele L Jacobson
*Assistant Examiner* — Assaf Zilbering
(74) *Attorney, Agent, or Firm* — Alson & Bird LLP

(57) ABSTRACT

Improved animal feeds and/or waters are provided, which include amendments comprising one or more copolymer salts serving to reduce volatilized ammonia derived from the excrement of animals. The copolymers are preferably water soluble and have substantially equimolar amounts of maleic and itaconic moieties.

15 Claims, No Drawings

(56) References Cited

U.S. PATENT DOCUMENTS

| | | | |
|---|---|---|---|
| 4,471,100 A | 9/1984 | Tsubakimoto et al. |
| 4,538,532 A | 9/1985 | Coker |
| 4,652,273 A | 3/1987 | Maldonado et al. |
| 4,663,408 A | 5/1987 | Schulz et al. |
| 4,701,204 A | 10/1987 | Duvdevani et al. |
| 4,709,091 A | 11/1987 | Fukumoto et al. |
| 4,725,655 A | 2/1988 | Denzinger et al. |
| 4,808,215 A | 2/1989 | Gill et al. |
| 4,844,725 A | 7/1989 | Malouf et al. |
| 4,872,412 A | 10/1989 | Zollinger |
| 4,897,220 A | 1/1990 | Trieselt et al. |
| 4,923,500 A | 5/1990 | Sylling |
| 4,929,690 A | 5/1990 | Goertz et al. |
| 4,933,098 A | 6/1990 | Gutierrez et al. |
| 4,936,897 A | 6/1990 | Pipko et al. |
| 4,952,415 A | 8/1990 | Winowiski et al. |
| 5,013,769 A | 5/1991 | Murray et al. |
| 5,024,676 A | 6/1991 | Moriyama et al. |
| 5,035,821 A | 7/1991 | Chung et al. |
| 5,047,078 A | 9/1991 | Gill |
| 5,054,434 A | 10/1991 | Wax et al. |
| 5,064,563 A | 11/1991 | Yamaguchi et al. |
| 5,106,648 A | 4/1992 | Williams |
| 5,113,619 A | 5/1992 | Leps et al. |
| 5,135,677 A | 8/1992 | Yamaguchi et al. |
| 5,188,654 A | 2/1993 | Manalastas et al. |
| 5,194,263 A | 3/1993 | Chamberlain et al. |
| 5,210,163 A | 5/1993 | Grey |
| 5,223,592 A | 6/1993 | Hughes et al. |
| 5,256,181 A | 10/1993 | Manalastas et al. |
| 5,294,651 A | 3/1994 | Stephens |
| 5,300,127 A | 4/1994 | Williams |
| 5,328,624 A | 7/1994 | Chung |
| 5,336,727 A | 8/1994 | Okazawa et al. |
| 5,391,632 A | 2/1995 | Krull et al. |
| 5,399,639 A | 3/1995 | Kimpton et al. |
| 5,427,785 A | 6/1995 | Ronson et al. |
| 5,435,821 A | 7/1995 | Duvdevani et al. |
| 5,536,311 A | 7/1996 | Rodrigues |
| 5,562,916 A | 10/1996 | Van Ooijen |
| 5,574,004 A | 11/1996 | Carr |
| 5,578,486 A | 11/1996 | Zhang |
| 5,597,400 A | 1/1997 | Nonomura et al. |
| 5,653,782 A | 8/1997 | Stern et al. |
| 5,666,905 A | 9/1997 | Mackin et al. |
| 5,681,678 A | 10/1997 | Nealey et al. |
| 5,688,907 A | 11/1997 | Wood et al. |
| 5,697,186 A | 12/1997 | Neyra et al. |
| 5,732,658 A | 3/1998 | Wolters et al. |
| 5,741,521 A | 4/1998 | Knight et al. |
| 5,760,150 A | 6/1998 | Bachus |
| 5,788,722 A | 8/1998 | Emert et al. |
| 5,916,029 A | 6/1999 | Smith et al. |
| 5,993,666 A | 11/1999 | Yamaguchi et al. |
| 5,994,265 A | 11/1999 | Barclay et al. |
| 5,997,602 A | 12/1999 | Aijala |
| 6,022,555 A | 2/2000 | DeLuca et al. |
| 6,057,398 A | 5/2000 | Blum |
| 6,100,221 A | 8/2000 | Poelker et al. |
| 6,100,224 A | 8/2000 | Peiffer et al. |
| 6,139,596 A | 10/2000 | Barth et al. |
| 6,180,589 B1 | 1/2001 | Rodrigues et al. |
| 6,187,074 B1 | 2/2001 | von Locquenghien et al. |
| 6,199,318 B1 | 3/2001 | Stewart et al. |
| 6,207,780 B1 | 3/2001 | Stockhausen et al. |
| 6,221,956 B1 | 4/2001 | Chen |
| 6,228,806 B1 | 5/2001 | Mehta |
| 6,271,191 B1 | 8/2001 | Kerobo et al. |
| 6,287,359 B1 | 9/2001 | Erhardt et al. |
| 6,309,439 B1 | 10/2001 | von Locquenghien et al. |
| 6,312,493 B1 | 11/2001 | Eltink et al. |
| 6,384,166 B1 | 5/2002 | Austin et al. |
| 6,395,051 B1 | 5/2002 | Arnold et al. |
| 6,413,292 B1 | 7/2002 | von Locquengh et al. |
| 6,444,771 B1 | 9/2002 | Yamaguchi et al. |
| 6,471,741 B1 | 10/2002 | Reinbergen |
| 6,488,734 B1 | 12/2002 | Barth et al. |
| 6,500,223 B1 | 12/2002 | Sakai et al. |
| 6,515,090 B1 * | 2/2003 | Sanders ............... C05D 9/02 526/266 |
| 6,515,091 B2 | 2/2003 | Sanders et al. |
| 6,544,313 B2 | 4/2003 | Peacock et al. |
| 6,569,976 B2 | 5/2003 | Baxter et al. |
| 6,586,560 B1 | 7/2003 | Chen et al. |
| 6,632,262 B2 | 10/2003 | Gabrielson |
| 6,635,702 B1 | 10/2003 | Schmucker-Castner et al. |
| 6,653,428 B1 | 11/2003 | Klein et al. |
| 6,703,469 B2 | 3/2004 | Sanders et al. |
| 6,734,148 B2 | 5/2004 | Bell et al. |
| 6,770,616 B1 | 8/2004 | McGowan et al. |
| 6,843,846 B2 | 1/2005 | Chatterji et al. |
| 6,844,293 B1 | 1/2005 | Kirby et al. |
| 6,855,182 B2 | 2/2005 | Sears |
| 6,897,184 B2 | 5/2005 | Kurita et al. |
| 6,897,253 B2 | 5/2005 | Schmucker-Castner et al. |
| 6,930,139 B2 | 8/2005 | Sanders et al. |
| 6,936,598 B2 | 8/2005 | Khoo et al. |
| 7,004,991 B2 | 2/2006 | Narayanan et al. |
| 7,019,046 B2 | 3/2006 | Narayanan et al. |
| 7,071,259 B2 | 7/2006 | Botros |
| 7,071,275 B2 | 7/2006 | Rath et al. |
| 7,201,959 B2 | 4/2007 | Judek et al. |
| 7,217,752 B2 | 5/2007 | Schmucker-Castner et al. |
| 7,317,062 B2 | 1/2008 | Pritschins et al. |
| 7,470,304 B2 | 12/2008 | Keenan et al. |
| 7,537,705 B2 | 5/2009 | Mizuno et al. |
| 7,572,328 B2 | 8/2009 | Lettkeman et al. |
| 7,615,521 B2 | 11/2009 | Eveland et al. |
| 7,655,597 B1 | 2/2010 | Sanders |
| 7,666,241 B2 | 2/2010 | Sanders et al. |
| 7,686,863 B1 | 3/2010 | Sanders |
| 7,695,541 B1 | 4/2010 | Frizzell et al. |
| 7,923,479 B2 | 4/2011 | Champ et al. |
| 7,942,941 B2 | 5/2011 | Cravey et al. |
| 8,025,709 B2 | 9/2011 | Sanders et al. |
| 8,043,995 B2 | 10/2011 | Sanders et al. |
| 8,097,076 B2 | 1/2012 | Göbelt et al. |
| 8,110,017 B2 | 2/2012 | Wells |
| 8,143,333 B2 | 3/2012 | Peppmoller et al. |
| 8,163,859 B2 | 4/2012 | Jeon et al. |
| 8,182,593 B2 | 5/2012 | Rapp |
| 8,192,520 B2 | 6/2012 | Sanders |
| 8,420,758 B2 | 4/2013 | Durant et al. |
| 8,430,943 B2 | 4/2013 | Sanders |
| 8,436,072 B2 | 5/2013 | Herth et al. |
| 8,491,693 B2 | 7/2013 | Burnham |
| 8,562,710 B2 | 10/2013 | Palmer et al. |
| 8,592,343 B2 | 11/2013 | Xavier et al. |
| 8,846,817 B2 | 9/2014 | Yontz et al. |
| 9,139,481 B2 | 9/2015 | Sanders |
| 9,145,340 B2 | 9/2015 | Sanders |
| 2001/0002390 A1 | 5/2001 | Rodrigues |
| 2001/0029762 A1 | 10/2001 | Steele et al. |
| 2002/0010296 A1 | 1/2002 | Baxter et al. |
| 2002/0049139 A1 | 4/2002 | Smale |
| 2002/0132886 A1 | 9/2002 | Meffert et al. |
| 2003/0203825 A1 | 10/2003 | Aubay |
| 2003/0225233 A1 | 12/2003 | Dilocker et al. |
| 2004/0202634 A1 | 10/2004 | L'Alloret |
| 2004/0211234 A1 | 10/2004 | Volgas et al. |
| 2004/0226329 A1 | 11/2004 | Sanders et al. |
| 2004/0226330 A1 | 11/2004 | Sanders et al. |
| 2004/0226331 A1 | 11/2004 | Sanders et al. |
| 2004/0230020 A1 | 11/2004 | Sanders et al. |
| 2004/0265266 A1 | 12/2004 | Champ et al. |
| 2004/0266621 A1 | 12/2004 | West |
| 2005/0050931 A1 | 3/2005 | Sanders et al. |
| 2005/0090402 A1 | 4/2005 | Dieing et al. |
| 2005/0158268 A1 | 7/2005 | Schmucker-Castner et al. |
| 2006/0030486 A1 | 2/2006 | Meyer et al. |
| 2006/0069004 A1 | 3/2006 | Song et al. |
| 2006/0078526 A1 | 4/2006 | Boyd et al. |
| 2006/0191851 A1 | 8/2006 | Mizuno et al. |
| 2006/0234901 A1 | 10/2006 | Scheuing et al. |

(56) References Cited

U.S. PATENT DOCUMENTS

| | | |
|---|---|---|
| 2007/0027281 A1 | 2/2007 | Michl et al. |
| 2007/0161524 A1 | 7/2007 | Counradi et al. |
| 2007/0212320 A1 | 9/2007 | Demitz et al. |
| 2007/0213243 A1 | 9/2007 | Yao et al. |
| 2007/0218168 A1 | 9/2007 | Hale, III |
| 2008/0044548 A1 | 2/2008 | Hale, III |
| 2008/0173053 A1 | 7/2008 | Sanders et al. |
| 2008/0189085 A1* | 8/2008 | Cook .................. G06Q 10/04 703/2 |
| 2009/0071213 A1 | 3/2009 | Keenan et al. |
| 2009/0149364 A1 | 6/2009 | Beck |
| 2009/0151755 A1 | 6/2009 | Beck |
| 2009/0163365 A1 | 6/2009 | Bentlage et al. |
| 2009/0227451 A1 | 9/2009 | Rose et al. |
| 2009/0258786 A1 | 10/2009 | Pursell et al. |
| 2009/0270257 A1 | 10/2009 | Pursell et al. |
| 2009/0308122 A1 | 12/2009 | Shah |
| 2010/0012040 A1 | 1/2010 | Pow et al. |
| 2010/0024500 A1 | 2/2010 | Tyler |
| 2010/0099566 A1 | 4/2010 | Bobnock |
| 2010/0120617 A1 | 5/2010 | Dyllick-Brenzinger et al. |
| 2010/0122379 A1 | 5/2010 | Dieckmann et al. |
| 2010/0167975 A1 | 7/2010 | Vandermeulen et al. |
| 2010/0175443 A1 | 7/2010 | Sanders et al. |
| 2010/0203228 A1 | 8/2010 | Funaki et al. |
| 2010/0210802 A1 | 8/2010 | Creamer et al. |
| 2010/0234233 A1 | 9/2010 | Sannino et al. |
| 2010/0234506 A1 | 9/2010 | Elizalde et al. |
| 2010/0298526 A1 | 11/2010 | Tsumori et al. |
| 2011/0042318 A1 | 2/2011 | Painter et al. |
| 2011/0095227 A1 | 4/2011 | Herth et al. |
| 2011/0146136 A1 | 6/2011 | Waterson et al. |
| 2011/0303157 A1 | 12/2011 | Laubenstein |
| 2012/0004383 A1 | 1/2012 | Laubender et al. |
| 2012/0055414 A1 | 3/2012 | Correa |
| 2012/0065071 A1 | 3/2012 | Li et al. |
| 2012/0118575 A1 | 5/2012 | Griffin |
| 2012/0129749 A1 | 5/2012 | Detering et al. |
| 2012/0129750 A1 | 5/2012 | Detering et al. |
| 2012/0220454 A1 | 8/2012 | Chen et al. |
| 2012/0277099 A1 | 11/2012 | Olson et al. |
| 2012/0277133 A1 | 11/2012 | DiBiase et al. |
| 2013/0090240 A1 | 4/2013 | Yamaguchi et al. |
| 2013/0171737 A1 | 7/2013 | Way et al. |
| 2013/0212739 A1 | 8/2013 | Giritch et al. |
| 2014/0106023 A1 | 4/2014 | Sanders |
| 2014/0106024 A1 | 4/2014 | Sanders |
| 2014/0315716 A1 | 10/2014 | Matheny et al. |
| 2014/0342905 A1 | 11/2014 | Bullis et al. |
| 2015/0033811 A1 | 2/2015 | Sanders |
| 2016/0174547 A1 | 6/2016 | Sanders et al. |
| 2016/0174549 A1 | 6/2016 | Sanders et al. |
| 2016/0175469 A1 | 6/2016 | Sanders et al. |
| 2016/0177004 A1 | 6/2016 | Sanders et al. |
| 2016/0185678 A1 | 6/2016 | Sanders et al. |
| 2016/0272553 A1 | 9/2016 | Sanders et al. |

FOREIGN PATENT DOCUMENTS

| | | | |
|---|---|---|---|
| CN | 101575243 A | 11/2009 | |
| CN | 101580409 | 11/2009 | |
| CN | 101792348 A | 8/2010 | |
| CN | 101830571 A | 9/2010 | |
| CN | 101885798 A | 11/2010 | |
| CN | 101885888 A | 11/2010 | |
| CN | 102154013 A | 8/2011 | |
| DE | 2558551 A1 * | 7/1977 | ............. C07C 57/13 |
| DE | 2822488 A1 | 11/1979 | |
| DE | 4122490 A1 | 1/1993 | |
| DE | 4132620 A1 | 4/1993 | |
| EP | 0290807 A2 | 11/1988 | |
| EP | 0314070 A2 | 5/1989 | |
| EP | 0337694 A2 | 10/1989 | |
| EP | 0683985 A1 | 11/1995 | |
| EP | 0877076 A2 | 11/1998 | |
| EP | 0892111 A1 | 1/1999 | |
| EP | 0976699 A1 | 2/2000 | |
| EP | 1024692 A1 | 8/2000 | |
| EP | 1230195 A1 | 8/2002 | |
| EP | 2135854 A2 | 12/2009 | |
| GB | 1324087 | 7/1973 | |
| JP | 54050027 A | 4/1979 | |
| JP | 54077294 A | 6/1979 | |
| JP | S58131903 A | 8/1983 | |
| JP | 60101194 A | 5/1985 | |
| JP | 61282301 A | 12/1986 | |
| JP | 62-096046 | 5/1987 | |
| JP | 63-148937 | 6/1988 | |
| JP | 63148937 A | 6/1988 | |
| JP | 03112426 | 5/1991 | |
| JP | H07215746 A | 8/1995 | |
| JP | 08092591 A | 4/1996 | |
| JP | 11092788 A | 4/1999 | |
| JP | 2008023433 A | 2/2008 | |
| RU | 2051884 C1 | 1/1996 | |
| RU | 2378869 C1 | 1/2010 | |
| WO | 9715367 A1 | 5/1997 | |
| WO | 9918785 A1 | 4/1999 | |
| WO | 9948833 A1 | 9/1999 | |
| WO | 2006131213 A1 | 12/2006 | |
| WO | 2007003388 A2 | 1/2007 | |
| WO | 2009060012 A2 | 5/2009 | |
| WO | 2009061930 A1 | 5/2009 | |
| WO | WO 2009111182 A1 * | 9/2009 | ............... C05B 7/00 |
| WO | 2015031521 A1 | 3/2015 | |
| WO | 2015035031 A1 | 3/2015 | |
| WO | 2015116716 A1 | 8/2015 | |
| WO | 2015179552 A1 | 11/2015 | |
| WO | 2015179687 A1 | 11/2015 | |

OTHER PUBLICATIONS

"AVAIL for liquid phophate fertilizers". Available online at s3.amazonaws.com on Jan. 16, 2012.*

Chiba, Lee I. Animal Nutrition Handbook, Section 12: Poultry Nutrition and Feeding. pp. 316-331, 2009; available online at http://www.ag.auburn.edu/%7Echibale/an12poultryfeeding.pdf.

Mohan, Prasanthrajan et al. Addressing the Challenges of Ammonia Loss from Poultry Droppings through Indigenous 2 Carbon Wastes. International Journal of Environmental Science and Development, vol. 3, No. 4, Aug. 2012—available online at http://www.ijesd.org/papers/255-D590.pdf.

Patterson, Paul H. Hen House Ammonia: Environmental Consequences and Dietary Strategies. Multi-State Poultry Meeting, May 14-16, 2002—available online at http://www.ijesd.org/papers/255-D590.pdf.

Powers, Wendy. Practices to Reduce Ammonia. 2004—available online at http://www.thepoultrysite.corn/articles/219/practices-to-reduce-ammonia.

Singh, A. et al. Efficacy of Urease Inhibitor to Reduce Ammonia Emission from Poultry Houses. J. Appl. Poult. Res., 18:34-42, 2009—available online at http://japr.fass.org/content/18/1/34.full.

International Search Report and Written Opinion, dated Jan. 23, 2014, in Application SN PCT/US2013/064378, filed Oct. 10, 2013.

Agrotain International LLC White Paper: Maleic-Itaconic Copolymer; available online at talk.newagtalk.com/forums/get-attachment.asp?attachmentid=42697; downloaded Feb. 1, 2017.

AVAIL MSDS dated Jan. 16, 2012.

Aziz, et al. *Efficiency of Slow Release Urea Fertilizer on Herb Yield and Essential Oil Production of Lemon Balm (Melissa Officinalis L.) Plant.* American-Eurasian J. Agric. & Environ. Sci., [Online] 5(2) :141-147, 2009.

Blair. Sulphur Enhanced Fertilizer (SEF). A new generation of fertilizers. The Proceedings of the International Plant Nutrition Colloquium XVI, Department of Plant Sciences, UC Davis, [Online] 2009.

Chen, et al. *Effect of a Polymer on Mitigating Ammonia Emission from Liquid Dairy Manure.* Efekat polimera na smanjenje emisije /Polj. tehn. (Jan. 2013), 1-13.

(56) References Cited

OTHER PUBLICATIONS

Chien et al. *Review of Maleic-Itaconic Acid Copolymer Purported as Urease Inhibitor and Phosphorus Enhancer in Soils* . . . Agronomy Journal 106(2) : 423-430, 2014.
CN Search Report in Application No. 201080047969.4 received with First Office Action dated Jul. 31, 2013.
Davidson et al. *Persistence of Rhizobium japonicum on the Soybean Seed Coat Under Controlled Temperature and Humidity*. Applied and Environmental Microbiology, 35 : 94-96, 1978.
EP Search Report 1 dated Jun. 16, 2016 in related Application No. 13847267.5.
EP Search Report 2 dated Jun. 10, 2016 in related Application No. 16161777.4.
EP Search Report 3 dated Jun. 13, 2016 in related Application No. 16161780.8.
EP Search Report 4 dated Jul. 26, 2016 in related Application No. 16161783.2.
EP Search Report 5 dated Jun. 13, 2016 in related Application No. 16161786.5.
EP Search Report 6 dated Jun. 20, 2016 in related Application No. 16161785.7.
Gay, et al. *Ammonia Emissions and Animal Agriculture*. Virginia Cooperative Extension, Publication 442-110, Virginia Polytechnic Institute and State University, 2009.
*Grains/Fertilizers*, article found online at martinsachs.angelfire.com/feeding.html, dated Apr. 11, 2010.
Groenstein, C.M. et al. *Measures to Reduce Ammonia Emissions from Livestock Manures; Now, Soon, Later*. Wageningen UK Livestock Research; Report 488; Jun. 2011.
Herrington et al. *Rheological modification of bitumen with maleic anhydride and dicarboxylic acids*. Fuel, 78 : 101-110, 1999.
International Preliminary Report on Patentability 1 in corresponding application PCT/US2014/052987, dated Mar. 10, 2016.
International Preliminary Report on Patentability 2 in related application PCT/US2014/054069, dated Dec. 11, 2014.
International Search Report and Written Opinion 1 in related application PCT/US2010/050244, dated Jun. 27, 2011.
International Search Report and Written Opinion 3 in related application PCT/US2013/054373, dated Dec. 12, 2013.
International Search Report and Written Opinion 4 in corresponding application PCT/US2014/052987, dated Jan. 16, 2015.
International Search Report and Written Opinion 5 in related application PCT/US2014/054069, dated Dec. 11, 2014.
International Search Report and Written Opinion 6 in related application PCT/US2014/049451, dated Dec. 18, 2014.
International Search Report and Written Opinion 7 in related application PCT/US2014/039424, dated Oct. 16, 2014.
International Search Report and Written Opinion 8 in related application PCT/US2015/013345, dated Apr. 13, 2015.
International Search Report and Written Opinion 9 in related application PCT/US2015/032037, dated Oct. 28, 2015.
International Search Report and Written Opinion 10 in related application PCT/US2015/031823, dated Oct. 28, 2015.
Jung et al. *Polymer-entrapped rhizobium as an inoculants for legumes*. Plant and Soil, 65 : 219-231, 1982.
Kahraman et al. *Bioengineering Polyfunctional Copolymers. VII. Synthesis and characterization of copolymers of p-vinylphenyl boronic acid with maleic and citraconic anhydrides and their self-assembled macrobranched supramolecular architectures*. Polymer 45 :5813-5828, 2004.
Kejun et al., *Copolymerization of cis-Butenedioic Acid with Sodium Methallylsulfonate in Aqueous Solution*. J. App. Poly. Sci., vol. 40 : 1529-1539; 1990.
Li et al. *Dispersion and Rheological Properties of Concentrated Kaolin Suspensions with Polycarboxylate Copolymers Bering Comb-like Side Chains*. Journal of the European Ceramic Society, 34(1) :137-146, Jan. 2014.
Machida et al. *Water Soluble Polymers. lx. N-(2-chloroethyl)-sulfonamides of Styrene-maleic Acid and Styrene-itaconic Acid Copolymers*. Sen'i Gakkaishi 22(6) :269-73,1996.
Naga et al. *Polymeric Additives for Pour Point Depression of Residual Fuel Oils*. J. Chem. Tech. Biotechnol. 35A : 241-247, 1985.
Prochnow, L.I. et al. *Controlling Ammonia Losses During Manure Composting with the Addition of Phosphogypsum and Simple Superphosphate*. Sci.Agri., Piracicaba, 52(2) :346-349, mai/ago 1995.
Puoci et al. *Polymer in Agriculture: a Review*. American Journal of Agricultural and Biological Sciences, 3 :299-314, 2008.
Sanderson, et al. *Effect of Gypsum and Elemental Sulphur on Calcium and Sulphur Content of Rutabagas in Podzolic Soils*. Can J Plan Sci [Online], pp. 785-788, 2002.
Shakkthivel et al. *Newly Developed Itaconic Acid Copolymers for Gypsum and Calcium Carbonate Scale Control*. Journal of Applied Polymer Science, 103(5) :3206-3213, 2007.
*Sodium Lignosulphonate*. Available online at www.xyd-chem.com on Apr. 20, 2010.
US Provisional Patent Application entitled Polyanionic Polymers, U.S. Appl. No. 62/001,110, filed May 21, 2014.
Weir, B.S. The current taxonomy of rhizobia. NZ Rhizobia website. http://www.rhizobia.co.nz/taxonomy/rhizobia; Partial update: May 2, 2013.
Yang, Charles Q. et al. *In-situ Polymerization of Maleic Acid and Itaconic Acid and Crosslinking of Cotton Fabric*. Textile Research Journal, 69(10) :782-789, 1999.
Yang, Charles Q. et al. *In-situ Polymerization of Maleic Acid and Itaconic Acid on Cotton: MALDI/TOF Mass Spectroscopy and Light-Scattering Study*. Textile Research Journal, 70(4) :359-62, 2000.
Yanhe et al. *Synthesis and Performance of Itaconic Acid-Maleic Acid Copolymer* . . . Indus. Wat. Treat. 2006 10, pagination unknown. DOI: cnki:ISSN:1005-829X.0.2006-10-017.
Yasmin, et al. *Effect of Elemental Sulfur, Gypsum, and Elemental Sulfur Coated Fertilizers on the Availability of Sulfur to Rice*. J Plant Nutr [Online], 20(1): 79-91, 2007.
Zhang et al. *Synthesis and Inhibition Efficiency of a Novel Quadripolymer Inhibitor*. Chin. J. Ch. E. 15(4) :600; 2007.

* cited by examiner

ANIMAL FEED AND/OR WATER AMENDMENTS FOR LOWERING AMMONIA CONCENTRATIONS IN ANIMAL EXCREMENT

CROSS-REFERENCE TO RELATED APPLICATION

This application is a continuation-in-part of application Ser. No. 13/791,263 filed Mar. 8, 2013, which (along with this application) claims the benefit of Provisional Application Ser. No. 61/713,757 filed Oct. 15, 2012, each of which is incorporated by reference herein in its entirety.

BACKGROUND OF THE INVENTION

Field of the Invention

The present invention is broadly concerned with animal feed and/or water amendments, and corresponding methods, which are designed to reduce the amount of gaseous ammonia resulting from the decomposition of animal excrement (i.e., manure and urine). More particularly, the invention is concerned with such amendments comprising copolymer salts, e.g., maleic-itaconic copolymer salts, which can be added to animal feed and/or water. A variety of livestock animals may be treated using the invention, including poultry and mammals.

Description of the Prior Art

Ammonia is a common by-product of animal waste due to the often inefficient conversion of feed nitrogen into animal protein. Poultry are often fed high-protein diets, which contain surplus nitrogen in order to assure that the animals' nutritional requirements are met. Nitrogen that is not metabolized into animal protein is secreted in the feces of poultry, where further microbial action release ammonia into the air during manure decomposition. In like manner, ruminants such as cattle are often fed non-protein nitrogen (NPN) as a part of their normal diets, and this can also exacerbate the problem of excess ammonia in cattle excrement.

Ammonia is typically considered an indoor air quality concern by animal producers, because the gas accumulates inside containment facilities such as poultry houses and cattle barns. Elevated levels of ammonia can have a negative impact on animal health and production, resulting in increased susceptibility to bacterial respiratory infection, decreased weight gains, and feed conversions.

Producers have adopted a number of strategies to lessen ammonia levels resulting from decomposition of animal manure and urine. Thus, it is known that a variety of treatments including aluminum sulfate (alum), ferrous sulfate, phosphoric acid, and other proprietary products may be sprayed or otherwise applied to poultry litter. Producers have also sought to minimize atmospheric ammonia in poultry containment facilities by manipulating poultry diets.

The usual strategy is to provide feeds which reduce the amount of nitrogen excreted by the poultry. For example, one dietary manipulation involves supplying poultry with the amino acid needed, including crystalline amino acids, instead of supply feed based primarily on crude protein content. Also, efforts have been made to add fermentable carbohydrates, such as bran or pulp, into grow-finishing diets. However, these efforts, while marginally reducing gaseous ammonia, have not fully answered the need to significantly ameliorate the ammonia problem.

Specialty Fertilizer Products, LLC, of Leawood, Kans. (SFP), has heretofore commercialized a series of maleic-itaconic copolymers principally for use with solid or liquid ammoniacal or phosphate fertilizers, such as urea or UAN fertilizers, in order to significantly increase the performance of the fertilizers as evidenced by increased yields.

These prior products include Nutrisphere-N® for Liquid Nitrogen Fertilizers, which is a partial calcium salt of a maleic-itaconic copolymer in water with a solids content of at least 30% w/w, and more preferably about 40% w/w. The copolymer is formulated using equimolar amounts of maleic and itaconic moieties. The final product has a pH of 1-2 and is a light brown to yellow viscous liquid.

Another such product is AVAILR® for Liquid Phosphate Fertilizers, which is a partial ammonium salt of a maleic-itaconic copolymer in water with a solids content of at least 30% w/w, and more preferably about 40% w/w. The copolymer is formulated using equimolar amounts of maleic and itaconic moieties. The final product has a pH of about 2 and is also a light brown to yellow viscous liquid.

SFP has also previously commercialized a manure nutrient manager product under the trademarks More Than Manure® or MTM®, which is primarily designed to reduce phosphorous lock-up and nitrogen loss when applied to manure in an open-air pit or lagoon, or directly onto litter after field application of the litter. MTM® is an aqueous mixture made up of two-thirds by volume Nutrisphere-N® for Liquid Nitrogen Fertilizers and one-third by volume of AVAIL® for Liquid Phosphate Fertilizers, having a solids content of from about 30-60% w/w, a pH of about 3 and a specific gravity of from about 1.1-1.4. Other benefits of the MTM® product include increased crop rotation flexibility, biodegradability, and reduction of manure solids. In such prior uses of MTM®, no odor-reduction studies were conducted, but numerous MTM® users expressed the opinion of a notable reduction of odor from the use of the product.

SUMMARY OF THE INVENTION

It has now been discovered that highly useful animal feed and/or water amendments can be provided which serve to significantly reduce gaseous ammonia concentrations in animal containment facilities. In particular, it has been found that amendments including salts (both complete and partial) of certain polyanionic copolymers can be added to animal feed and/or water to good effect. For example, conventional poultry feeds comprising feed ingredients including quantities of corn and soybean meal can be improved using the amendments of the invention. In like manner, poultry water may be supplemented with the amendments. In either instance, the amount of amendment used should be sufficient to reduce volatilized ammonia derived from the feces of poultry, as compared with poultry receiving the same feed and/or water, but without the amendments. Similarly, mammalian animal feeds and waters can be improved by the addition of the copolymers of the invention, again in amounts sufficient to reduce volatilized ammonia derived from mammalian excrement, as compared with animals receiving the same feed and/or water, but without the amendments.

As used herein, "copolymers" refers to copolymers containing therein respective amounts of at least two different moieties or repeat units, e.g., maleic and itaconic moieties or repeat units. The term thus embraces essentially pure copolymers made up of only two different moieties or repeat units, and also other types of copolymers containing a number of different moieties or repeat units. The "salts" of copolymers are formed using virtually any mono- or polyvalent salt-forming cations.

Advantageously, the amendments of the invention comprise different salts regardless of the type of copolymer employed. That is to say, the amendments may comprise two identical copolymers, but are reacted with different salt-forming cations, e.g., the calcium and ammonium salts of identical maleic-itaconic copolymers.

In one preferred implementation of the present invention, poultry feeds and/or waters are supplemented with a minor amount of the previously described aqueous MTM® product. In the case of poultry feed supplementation, the MTM® is usually used at a level of from about 0.05-0.25% by weight (corresponding to 387-1900 mls of MTM® per ton of feed), where the total amount of the supplemented feed is taken as 100% by weight. Where poultry water is supplemented, the MTM® should be used at a level of from about 0.01-0.25% by volume (corresponding to 7.57-189 mls of MTM® per 20 gallons of water), more preferably from about 0.1-0.2% by volume, where the total amount of the supplemented water is taken as 100% by volume.

Employment of the aqueous MTM® product as mammalian feed and/or water amendments is also highly useful. In the case of cattle, e.g., the feed should be supplemented with from about 0.01-1% by weight, and more preferably from about 0.1-0.4% by weight of the MTM® product. Mammalian water may be supplemented with 0.01-1% by volume, more preferably from about 0.1-0.4% by volume of the MTM® product.

DETAILED DESCRIPTION OF THE PREFERRED EMBODIMENT

The Copolymer Salts

The ensuing detailed description of preferred copolymers makes use of the art-accepted term "repeat units" to identify the moieties in the copolymers. As used herein, "repeat unit" refers to chemically converted forms (including isomers and enantiomers) of initially chemically complete monomer molecules, where such repeat units are created during polymerization reactions, with the repeat units bonding with other repeat units to form a polymer chain. Thus, a type B monomer will be converted to a type B repeat unit, and type C and type G monomers will be converted type C and G repeat units, respectively. For example, the type B maleic acid monomer will be chemically converted owing to polymerization conditions to the corresponding type B maleic acid repeat unit, as follows:

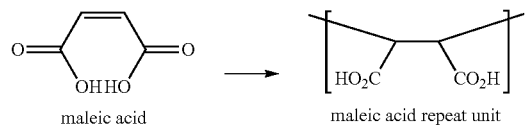

maleic acid      maleic acid repeat unit

Different monomers within a given polymerization mixture are converted to corresponding repeat units, which bond to each other in various ways depending upon the nature of the repeat groups and the polymerization reaction conditions, to create the final polymer chain, apart from end groups.

In carrying out the invention, it has been determined that the partial or complete salts of certain specific families or classes of copolymers are particularly suitable. These are described below as "Class I," "Class II," and "Class IIA" copolymers.

Class I Copolymers

The copolymers of this class are preferably the maleic-itaconic copolymers disclosed in U.S. Pat. Nos. 6,515,090 and 8,043,995, which are incorporated by reference herein in their entireties. These preferred copolymers include respective quantities of maleic and itaconic repeat units, and optionally other repeat units.

The Class I copolymers may have a wide variety of molecular weights, ranging for example from 500-5,000,000, more preferably from 1500-10,000, depending chiefly upon the intended end use. The preferred salt-forming cations are selected from the group consisting of Fe, Mn, Zn, Cu, Ni, Co, Mo, V, Cr, Si, B, W, the alkali and alkaline earth metals, amines, polyatomic cations containing any of the foregoing (e.g., $VO^{+2}$), and mixtures thereof.

The ratio of maleic repeat units to itaconic repeat units in the Class I copolymers can vary widely, e.g., 10:90, 60:40, and 50:50. Such ratios may be produced by varying the monomer amounts in the reaction mixtures from which the final products are eventually synthesized.

Preferred Class I Maleic-Itaconic Copolymers

The most preferred Class I copolymers are principally composed of maleic and itaconic repeat units. Such copolymers preferably include at least about 85% by weight maleic and itaconic repeat units (i.e., the total combined weight of the maleic and itaconic repeat units is at least 85% of the total repeat unit weight), and more preferably at least about 93% by weight thereof.

In the most preferred cases, the Class I copolymers have essentially no other repeat units, and have the generalized formula

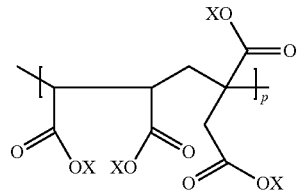

where X is selected from the group consisting of H and a cation of the previously described group, and p ranges from about 10-500. Advantageously, the most preferred Class I copolymers are in the partial salt form, wherein some X substituents are H, and others are salt-forming cations different than H.

In a specific example of the synthesis of a maleic-itaconic Class I copolymer, acetone (803 g), maleic anhydride (140 g), itaconic acid (185 g) and benzoyl peroxide (11 g) were stirred together under inert gas in a reactor. The reactor included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo. A schematic representation of this reaction is shown below.

Step 1

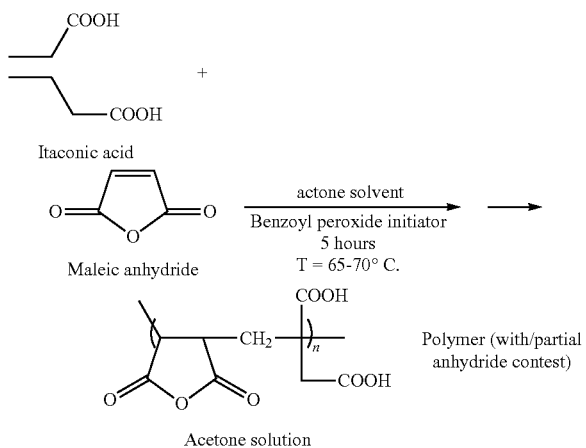

Step 2

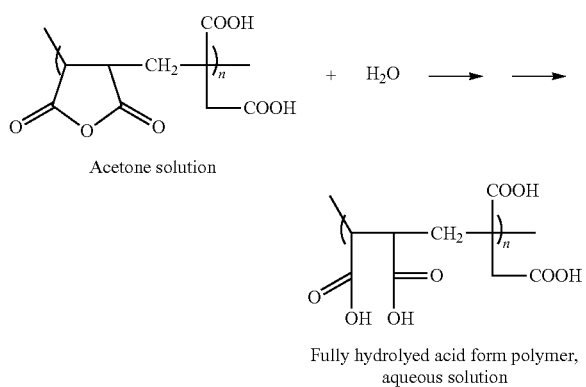

Class II Copolymers

The Class II copolymers of the present invention are at least tetrapolymers, i.e., they are composed of at least four different repeat units individually and independently selected from the group consisting of type B, type C, and type G repeat units, and mixtures thereof, described in detail below. However, the Class II copolymers comprehend copolymers having more than four distinct repeat units, with the excess repeat units being selected from the group consisting of type B, type C, and type G repeat units, and mixtures thereof, as well as other monomers or repeat units not being type B, C, or G repeat units.

Preferred Class II copolymers contain at least one repeat unit from each of the B, C, and G types, one other repeat unit selected from the group consisting of type B, type C, and type G repeat units, and optionally other repeat units not selected from type B, type C, and type G repeat units. Particularly preferred copolymers comprise a single type B repeat unit, a single type C repeat unit, and two different type G repeat units, or two different type B repeat units, a single type C repeat unit, and one or more different type G repeat units.

However constituted, preferred Class II copolymers contain at least about 90 mole percent (more preferably at least about 96 mole percent) of repeat units selected from the group consisting of type B, C, and G repeat units (i.e., the copolymers should contain no more than about 10 mole percent (preferably no more than about 4 mole percent) of repeat units not selected from types B, C, and G). The most preferred final copolymers should be substantially free of ester groups (i.e., no more than about 5 mole percent ester groups, more preferably no more than about 1 mole percent).

The Class II copolymers may be converted to a wide range of salts, whether fully saturated (wherein all anionic groups are paired with a suitable cation, e.g., a metal or amine) or partial (wherein not all anionic groups are so paired), and may be made using either a single cation (e.g., sodium), or using any number of different cations at any level (e.g., mixed sodium and ammonium cations). Metal cations can be simple cations such as sodium or calcium, but more complex cations can also be used, such as cations containing a metal atom and other atom(s) as well, e.g., vanadyl cations. Among preferred metal cations (to be used alone or as mixed salts) are those derived from alkali, alkaline earth, and transition metals. The copolymers may also be in the form of amine partial or complete salts (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine.

The degree of cation substitution and the identity of cation(s) may be varied completely independently of each other. This flexibility allows production of many different full or partial salt copolymers of desirable properties. The solubility and other properties of the copolymers can be modified by judicious selection of the types and amounts of salt-forming cations. For example, by increasing the level of divalent cations (e.g., Ca, Mg) and elevating the pH of aqueous dispersions of the copolymers above pH 1, the properties of the final copolymers may be substantially modified.

1. Type B Repeat Units

Type B repeat units are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably C1-C6 straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. Similarly, the "salts" of the type B repeat units refers to partial or complete salts prepared using salt-forming cations selected from the group consisting of metals, amines, and mixtures thereof. In preferred forms, the total amount of type B repeat units in the Class II copolymers of the invention should range from about 1-70 mole percent, more preferably from about 20-65 mole percent, and most preferably from about 35-55 mole percent, where the total amount of all of the repeat units in the Class II copolymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial copolymerization, this should be followed by hydrolysis (acid or base) of pendant ester groups to generate a final carboxylated copolymer substantially free of ester groups.

2. Type C Repeat Units

Type C repeat units are derived from monomers of itaconic acid and/or anhydride, substituted itaconic acid and/or anhydride, as well as isomers, esters, acid chlorides, and partial or complete salts of any of the foregoing. The type C repeat units are present in the preferred Class II copolymers of the invention at a level of from about 1-80 mole percent, more preferably from about 15-75 mole percent, and most preferably from about 20-55 mole percent, where the total amount of all of the repeat units in the copolymer is taken as 100 mole percent.

The itaconic acid monomer used to form type C repeat unit has one carboxyl group, which is not directly attached to the unsaturated carbon-carbon double bond used in the copolymerization of the monomer. Hence, the preferred type C repeat unit has one carboxyl group directly bound to the copolymer backbone, and another carboxyl group spaced by a carbon atom from the copolymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the copolymerization reaction. Any remaining ester groups in the copolymer are normally hydrolyzed, so that the final carboxylated copolymer is substantially free of ester groups.

3. Type G Repeat Units

Type G repeat units are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of C 1-C8 straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the Class II copolymers of the invention should range from about 0.1-65 mole percent, more preferably from about 1-35 mole percent, and most preferably from about 1-25 mole percent, where the total amount of all of the repeat units in the Class II copolymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during copolymerization reactions yielding the novel copolymers of the invention, the presence of mixtures of alkali metal salts of these monomers with acid forms thereof does not inhibit completion of the copolymerization reaction.

As noted previously, the total abundance of type B, C, and G repeat units in the Class II copolymers of the invention is preferably at least about 90% mole percent, more preferably at least about 96% mole percent, and most preferably the copolymers consist essentially of or are 100 mole percent B, C, and G-type repeat units. It will be understood that the relative amounts and identities of copolymer repeat units can be varied, depending upon the specific properties desired in the resultant Class II copolymers. For a variety of applications, certain tetrapolymer compositions are preferred, i.e., a preferred copolymer backbone composition range (by mole %, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the Class II copolymer is taken as 100 mole percent. It has also been found that even small amounts of repeat units, which are neither B nor C repeat units, can significantly impact the properties of the final copolymers, as compared with prior BC copolymers. Thus, even 1 mole percent of each of 2 different G repeat units can result in a tetrapolymer exhibiting drastically different behaviors, as compared with BC copolymers.

The molecular weight of the Class II copolymers is also highly variable, again depending principally upon the desired properties. Generally, the molecular weight distribution for Class II copolymers in accordance with the invention is conveniently measured by size exclusion chromatography. Broadly, the molecular weight of the copolymers ranges from about 800-50,000, and more preferably from about 1000-5000. For some applications, it is advantageous that at least 90% of the finished Class II copolymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

As noted previously, the Class II copolymers of the invention may be mixed with or complexed with metal or non-metal ions, and especially those selected from the group of simple cations such as the alkali and alkaline earth metals, Fe, Mn, Zn, Cu, Ni, Co, Mo, Mb, V, Cr, Si, B, Ca, and compounds containing these cations, e.g., boric acid, borates, molybdates, more complex cations such as vanadyl ions [VO]2+, and other complex ions containing vanadium, amines, and mixtures of any of the foregoing.

The Class II copolymers of the invention can also be used in formulations containing a wide variety of other ingredients, including but not limited to alcohols, diols, polyols, organic acids, polyvinyl alcohols, dyes, plastics, and mixtures thereof.

Syntheses of the Class II Copolymers

Virtually any conventional method of free radical copolymerization may be suitable for the synthesis of the Class II copolymers of the invention. However, a preferred and novel synthesis may be used, which is applicable not only for the production of the Class II copolymers of the invention, but also for the synthesis of copolymers containing dicarboxylate repeat units and sulfonate repeat units and preferably containing at least one carbon-carbon double bond. Such types of copolymers are disclosed in U.S. Pat. Nos. 5,536,311 and 5,210,163.

Generally speaking, the new synthesis methods comprise carrying out a free radical copolymerization reaction between dicarboxylate and sulfonate repeat units in the presence of hydrogen peroxide and vanadium-containing species to achieve a conversion to copolymer in excess of 90%, and more preferably in excess of 98%, by mole. That is, a dispersion of the dicarboxylate and sulfonated monomers is created and free radical initiator(s) are added followed by allowing the monomers to copolymerize.

Preferably, the hydrogen peroxide is the sole initiator used in the reaction, but in any case, it is advantageous to conduct the reaction in the absence of any substantial quantities of other initiators (i.e., the total weight of the initiator used should be about 95% by weight hydrogen peroxide, more preferably about 98% by weight, and most preferably 100% by weight thereof). Various sources of vanadium may be employed, with vanadium oxysulfates being preferred.

It has been discovered that it is most advantageous to perform these copolymerization reactions in substantially aqueous dispersions (e.g., at least about 95% by weight water, more preferably at least about 98% by weight water, and most preferably 100% by weight water). The aqueous dispersions may also contain additional monomer, but only to the minor extent noted.

It has also been found that the preferred copolymerization reactions may be carried out without the use of inert atmospheres, e.g., in an ambient air environment. As is well known in the art, free radical copolymerization reactions in dispersions are normally conducted in a way that excludes the significant presence of oxygen. As a result, these prior techniques involve such necessary and laborious steps as degassing, inert gas blanketing of reactor contents, monomer treatments to prevent air from being present, and the like. These prior expedients add to the cost and complexity of the copolymerizations, and can present safety hazards. However, in the copolymerizations of the copolymers of the present invention, no inert gas or other related steps are required, although they may be employed if desired.

One preferred embodiment comprises creating highly concentrated aqueous dispersions of solid monomer particles (including saturated dispersions containing undissolved monomers) at a temperature of from about 50-125° C., more preferably from about 75-110° C., and adding vanadium oxysulfate to give a vanadium concentration in the dispersion of from about 1-1000 ppm, and more preferably from about 5-500 ppm (metals basis). This is followed by the addition of hydrogen peroxide over a period of from about 30 minutes - 24 hours (more preferably from about 1-5 hours) in an amount effective to achieve copolymerization. This process is commonly carried out in a stirred tank reactor equipped with facilities for controlling temperature and composition, but any suitable equipment used for copolymerization may be employed.

Another highly preferred and efficient embodiment involves charging a stirred tank reactor with water, followed by heating and the addition of monomers to give a dispersion having from about 40-75% w/w solids concentration. Where maleic and/or itaconic monomers are employed, they may be derived either from the corresponding acid monomers, or from in situ conversion of the anhydrides to acid in the water. Carboxylate and sulfonated monomers are preferred in their acid and/or anhydride form, although salts may be used as well. Surprisingly, it has been found that incomplete monomer dissolution is not severely detrimental to the copolymerization; indeed, the initially undissolved fraction of monomers will dissolve at some time after copolymerization has been initiated.

After the initial heating and introduction of monomers, the reactor contents are maintained at a temperature between about 80-125° C., with the subsequent addition of vanadium oxysulfate. Up to this point in the reaction protocol, the order of addition of materials is not critical. After introduction of vanadium oxysulfate, a hydrogen peroxide solution is added over time until substantially all of the monomers are converted to copolymer. Peroxide addition may be done at a constant rate, a variable rate, and with or without pauses, at a fixed or variable temperature. The concentration of peroxide solution used is not highly critical, although the concentration on the low end should not dilute the reactor contents to the point where the reaction becomes excessively slower impractically diluted. On the high end, the concentration should not cause difficulties in performing the copolymerization safely in the equipment being used.

After the copolymerization is completed, the cations present may be left as they are, or additional cations may be added. For example, the reactor contents may be neutralized to a higher pH by the addition of various alkali metal or alkaline earth metal cations, ammonia, amines, or any other suitable cation source, thereby providing various mixed salts of the copolymer, if desired.

Preferably, the copolymerization reactions of the invention are carried out to exclude substantial amounts of dissolved iron species (i.e., more than about 5% by weight of such species). This is distinct from certain prior techniques requiring the presence of iron-containing materials. Nonetheless, it is acceptable to carry out the copolymerization of the invention in 304 or 316 stainless steel reactors. It is also preferred to exclude from the copolymerization reaction any significant amounts (nor more than about 5% by weight) of the sulfate salts of ammonium, amine, alkali and alkaline earth metals, as well as their precursors and related sulfur-containing salts, such as bisulfites, sulfites, and metabisulfites. It has been found that use of these sulfate-related compounds leaves a relatively high amount of sulfates and the like in the final copolymers, which either must be separated or left as a product contaminant.

The high copolymerization efficiencies of the preferred syntheses result from the use of water as a solvent and without the need for other solvents, elimination of other initiators (e.g., azo, hydroperoxide, persulfate, organic peroxides) iron and sulfate ingredients, the lack of recycling loops, so that substantially all of the monomers are converted to the finished copolymers in a single reactor. This is further augmented by the fact that the copolymers are formed first, and subsequently, if desired, partial or complete salts can be created.

EXAMPLES

The following examples describe preferred synthesis techniques for preparing copolymers; it should be understood, however, that these examples are provided by way of illustration only and nothing therein should be taken as a limitation on the overall scope of the invention.

Example 1

Exemplary Synthesis

Apparatus:

A cylindrical reactor was used, capable of being heated and cooled, and equipped with efficient mechanical stirrer, condenser, gas outlet (open to atmosphere), solids charging port, liquids charging port, thermometer and peroxide feeding tube.

Procedure: Water was charged into the reactor, stirring was initiated along with heating to a target temperature of 95° C. During this phase, itaconic acid, sodium methallylsulfonate, sodium allylsulfonate, and maleic anhydride were added so as to make a 50% w/w solids dispersion with the following monomer mole fractions:

maleic: 45%
itaconic: 35%
methallylsulfonate: 15%
allylsulfonate: 5%

When the reactor temperature reached 95° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 5% of the dispersion weight in the reactor prior to peroxide addition. After the peroxide addition was complete, the reactor was held at 95° C. for two hours, followed by cooling to room temperature.

The resulting copolymer dispersion was found to have less than 2% w/w total of residual monomers as determined by chromatographic analysis.

Example 2

Exemplary Synthesis

Apparatus:
Same as Example 1

Procedure: Water was charged into the reactor, stirring was initiated along with heating to a target temperature of 100° C. During this phase, itaconic acid, sodium methallylsulfonate, sodium allylsulfonate, and maleic anhydride were added so as to make a 70% w/w solids dispersion with the following monomer mole fractions:

maleic: 45%
itaconic: 50%
methallylsulfonate: 4%
allylsulfonate: 1%

When the reactor temperature reached 100° C., vanadium oxysulfate was added to give a vanadium metal concentration of 25 ppm by weight. After the vanadium salt fully dissolved, hydrogen peroxide (as 50% w/w dispersion) was added continuously over 3 hours, using the feeding tube. The total amount of hydrogen peroxide added was 7.5% of the dispersion weight in the reactor prior to peroxide addition. After the peroxide addition was complete, the reactor was held at 100° C. for two hours, followed by cooling to room temperature.

The resulting copolymer dispersion was found to have less than 1% w/w total of residual monomers as determined by chromatographic analysis.

Example 3

Preparation of Tetrapolymer Partial Salts

A tetrapolymer partial sodium salt dispersion containing 40% by weight copolymer solids in water was prepared by the preferred free radical copolymerization synthesis of the invention, using an aqueous monomer reaction mixture having 45 mole percent maleic anhydride, 35 mole percent itaconic acid, 15 mole percent methallylsulfonate sodium salt, and 5 mole percent allylsulfonate. The final tetrapolymer dispersion had a pH of slightly below 1.0 and was a partial sodium salt owing to the sodium cation on the sulfonate monomers. At least about 90% of the monomers were copolymerized in the reaction.

This sodium partial salt tetrapolymer was used to create a series of 40% solids in water partial salts. In each instance, apart from the sodium present in the tetrapolymer mixture, appropriate bases or base precursors (e.g., carbonates), or mixtures thereof were added to the aqueous tetrapolymer at room temperature to generate the corresponding salts. In all instances, the in situ sodium resulting from the synthesis was the primary source of sodium used in the conversions. Specifically, the following basic reactants were employed with quantities of the tetrapolymer to give the following salts:

Salt A—sodium hydroxide, pH 7.
Salt B—ammonium hydroxide and a minor amount of sodium hydroxide, pH 2.
Salt C—calcium carbonate and a minor amount of sodium hydroxide, pH 1.5.
Salt D—calcium carbonate and a minor amount of sodium hydroxide, pH 3.5.
Salt E—isopropylamine, pH 4.8.
Salt F—triethanolamine, pH 7.
Salt G—zinc carbonate, manganese carbonate, cupric basic carbonate, and sodium hydroxide, pH 6 (Zn content 2% by weight, Mn content 1% by weight, Cu content 250 ppm).
Salt H—zinc carbonate, pH 5 (Zn content 5% by weight).
Salt I—manganese carbonate, pH 4 (Mn content 5% by weight).

Syntheses of the Class IIA Copolymers

Class IIA copolymers contain both carboxylate and sulfonate functional groups, but are not the tetra- and higher order copolymers of Class II. For example, terpolymers of maleic, itaconic, and allylsulfonic repeat units, which are per se known in the prior art, will function as the polyanionic copolymer component of the compositions of the invention. The Class IIA copolymers thus are normally homopolymers, copolymers, and terpolymers, advantageously including repeat units individually and independently selected from the group consisting of type B, type C, and type G repeat units, without the need for any additional repeat units. Such copolymers can be synthesized in any known fashion, and can also be produced using the previously described Class II copolymer synthesis.

Class IIA copolymers preferably have the same molecular weight ranges as the previously described Class II copolymers, and may be converted to partial or complete salts using the same cations and techniques described with reference to the Class II copolymers.

Example 4

Exemplary Synthesis

A terpolymer salt dispersion containing 70% by weight copolymer solids in water was prepared using a cylindrical reactor capable of being heated and cooled, and equipped with an efficient mechanical stirrer, a condenser, a gas outlet open to the atmosphere, respective ports for charging liquids and solids to the reactor, a thermometer, and a peroxide feeding tube.

Water (300 g) was charged into the reactor with stirring and heating to a target temperature of 95° C. During heating, itaconic acid, sodium methallylsulfonate, and maleic anhydride were added so as to make a 75% w/w solids dispersion with the following monomer mole fractions: maleic anhydride—20%; itaconic acid—60%; methallylsulfonate sodium salt—20%. When the monomers were initially added, they were in suspension in the water. As the temperature rose, the monomers became more fully dissolved before copolymerization was initiated, and the maleic anhydride was hydrolyzed to maleic acid. When the reactor temperature reached 95° C., vanadium oxysulfate was added to yield a vanadium metal concentration of 50 ppm by weight of the reactor contents at the time of addition of the vanadium salt. After the vanadium salt fully dissolved, hydrogen peroxide was added as a 50% w/w dispersion in water continuously over two hours. At the time of hydrogen peroxide addition, not all of the monomers were completely dissolved, achieving what is sometimes referred to as "slush copolymerization"; the initially undissolved monomers were subsequently dissolved during the course of the reaction. The total amount of hydrogen peroxide added equaled 5% of the dispersion weight in the reactor before addition of the peroxide.

After the peroxide addition was completed, the reaction mixture was held at 95° C. for two hours, and then allowed to cool to room temperature. The resulting copolymer dispersion had a pH of slightly below 1.0 and was a partial sodium salt owing to the sodium cation on the sulfonate monomers. The dispersion was found to have a monomer content of less than 2% w/w, calculated as a fraction of the total solids in the reaction mixture, as determined by chromatographic analysis. Accordingly, over 98% w/w of the initially added monomers were converted to copolymer.

The Amendments

The complete amendments should preferably contain at least about 30-60% by weight of total copolymer solids (more preferably from about 35-50% by weight solids), and from about 40-70% by weight water (most preferably from about 50-65% water). However, the amendments may also include other ingredients apart from the two partial salt copolymers and water, such as pH adjustment agents, buffering agents, preservatives, and emulsifiers. Any such other ingredients are preferably used at a minor level, e.g., from about 1-10% by weight. The pH of the complete amendments should be acid, preferably from about 1-5, more preferably from about 2-4.

Where the amendment comprises an aqueous mixture including a partial calcium salt of a copolymer and a partial ammonium salt of a copolymer (as in the case of the preferred MTM® product), the calcium partial salt copolymer solids should be present in an amount greater than the amount of the ammonium partial salt copolymer solids therein. That is, taking the total weight of both copolymer salt solids as 100% by weight, the calcium partial salt copolymer solids should be present at a level of from about 50-80% by weight (more preferably from about 55-75% by weight, and most preferably from about 60-65% by weight), and the ammonium partial salt copolymer solids should be present at a level of from about 20-50% by weight (more preferably from about 25-45% by weight, and most preferably from about 35-40% by weight). Also, the individual copolymer salts in water should both have a pH on the order of from about 1-4.

The Preferred Uses of the Amendments

Generally speaking, the amendments of the invention are administered to animals by adding the amendments to otherwise conventional animal feeds, and/or adding the amendments to the animal water supply.

In the case of poultry, use can be made of commercially available or custom poultry feeds, which are typically substantially dry and particulate in nature. Such feeds typically contain yellow corn at a level of from about 45-65% by weight, together with soybean at a level of from about 18-45% by weight. These feeds also commonly include a variety of other ingredients, such as meat and bone meals, fats, salt, limestone or oyster shell, amino acids, vitamins and minerals, and have analyses of protein (N×6.25) of from about 15-32%, and a Metabolizable Energy (ME) value of from about 1100-1600 kcal/lb. Further information about conventional poultry feeds can be found in *Poultry Nutrition and Feeding*, Section 12, *Animal Nutrition Handbook*, pp. 316-331 (2009), which is wholly incorporated herein by reference. The amendments of the invention, typically in aqueous liquid form, are sprayed or otherwise applied to the dry poultry feed ingredients with mixing, to substantially intersperse the copolymer materials with the feed ingredients. The improved feed is then fed ad libitum to poultry. The complete water/copolymer salt amendments should be present in an improved feed at a level of from about 0.05-0.25% by weight (more preferably from about 0.1-0.2% by weight), where the total weight of the supplemented or amended feed is taken as 100% by weight. This corresponds to a level of from about 0.015-0.15% by weight (more preferably 0.03-0.12% by weight) of copolymer solids per se in the poultry feed.

In the case of adding the complete water/copolymer salt amendments to poultry water, the usage would typically be at a level of from about 0.01-0.25% by volume, more preferably from about 0.05-0.2% by volume, where the total amount of supplemented or amended water is taken as 100% by volume. This corresponds to a level of from about 0.003-0.15% by volume (more preferably 0.0045-0.12% by volume) of the copolymer solids per se in the poultry water. Inasmuch as the preferred partial salt copolymers of the invention and the MTM® product, are water soluble, the complete amendments readily mix and evenly disperse in the poultry water.

The amendments of the invention, used either with poultry feed or poultry water can be fed to virtually any poultry, e.g., chicken, duck, goose, peafowl, swan, ostrich, pigeon, turkey, guineafowl, pheasant, rhea, and emu.

Where the complete amendments are employed to supplement mammalian animal feeds and/or waters, the same general techniques and amounts of complete amendments and copolymers are employed. For example, the amendments may be directly mixed with animal feeds or used as a top dressing thereon. Likewise, the animals' water supply is supplemented as described previously. The fact that the copolymers are water soluble greater facilitates uses thereof. The amendments of the invention may be fed to a wide variety of livestock, e.g., mammals such as cattle, sheep, swine, and horses.

As indicated above, it is preferred that the amendments of the invention be used in the form of aqueous mixtures containing copolymer salt(s). However, and especially in the case of amendments to poultry or animal waters, the copolymer solids can be added as is, and not in a complete water/copolymer amendment. In such instances, the above ranges of addition of the copolymers themselves are applicable.

The following examples illustrate preferred animal feeds, waters, and methods of feeding and/or watering in accordance with the invention. It should be understood, however, that these examples are provided by way of illustration only, and nothing therein should be taken as a limitation upon the overall scope of the invention.

Example 1

Poultry

Twenty broiler chickens of common variety were separated into two groups denoted "A" and "B," with group A being the research group, and B being the control group. The chickens were placed into conventional chicken coops made of wire and wood, with typical litter on the floor trays of the coops. Heat lamps were attached to each coop at identical locations, along with a gravity-fed one-gallon water container and a gravity-fed feeder. Plastic sheeting was placed over the coops in order to trap volatilizing ammonia with open-ventilation at the front and sides of the coops. The birds had access to water and feed during all daylight hours.

During the test, both the A and B groups were fed Purina Flock Raiser premium quality poultry feed. However, feed for the group A chickens was supplemented with 0.25% (w/w) of the previously described MTM® copolymeric material, and the Group A water was also supplemented with 0.5% (v/v) of the MTM® material.

During the course of the test, all of the litter and liquid was collected in ten-gallon buckets when the coop trays were filled. Also, periodic ammonia readings were taken with a MiniRae 3000 PID handheld meter, with subsequent readings taken at the end of the experiment using a Drager X-AM 5000 handheld reactive meter, together with physical observations of odor. At the end of the test period, necropsies, tissue, and blood tests were taken of the test chickens.

Periodic ammonia readings were recorded in each coop litter tray, at bird level within each coop, in the air pocket above the coop, and inside the collection bucket with scraped litter from the tray. The following results were recorded.

TABLE 1

| Day | Tray NH$_3$-ppm | | Coop NH$_3$ (ppm) | | Pocket NH$_3$-ppm | | Bucket NH$_3$-ppm | |
|---|---|---|---|---|---|---|---|---|
| Group ID | A | B | A | B | A | B | A | B |
| 1 | 0 | 0 | 0 | 0 | 0 | 0 | 0 | 0 |
| 5 | 0.41 | 3.69 | 0.21 | 2.30 | 1.68 | 2.26 | 0 | 0 |
| 9 | 1.16 | 1.37 | 0.45 | 1.33 | 0.49 | 2.50 | 0 | 0 |
| 14 | 0.10 | 0.70 | 0 | 0 | 0.40 | 0.65 | 0 | 0 |
| 19 | 1.50 | 4.50 | 0 | 0 | 1.00 | 1.10 | 94 | 163 |
| 21 | 1.00 | 1.30 | 0.45 | 0.85 | 0.80 | 0.90 | 16 | 80 |
| 26 | 2.50 | 11 | 1.00 | 1.50 | 1.50 | 2.50 | 38 | 250 |
| 30 | 3.5 | 10 | 1.00 | 1.00 | 3.80 | 3.50 | 38 | 68 |
| 35 | 20.5 | 33 | 3.50 | 5.5 | 20 | 32 | 16 | 23[1] |
| 37 | 3.7 | 7 | 0.3 | 0.1 | 1.6 | 3.1 | 2.0 | 3.5[2] |
| 40 | 8 | 12 | 0 | 1.7 | 9.1 | 7.2 | 35 | 80[3] |
| 49 | 0.5 | 0.5 | 0 | 0.5 | 0.5 | 0.5 | 49 | 300/149[4] |

[1]Measurement taken after bucket materials had dried, and lid opened
[2]Measurement taken after bucket materials had dried in the open
[3]Measurement taken after bucket lid removed
[4]Measurement of 300 ppm taken with bucket lid cracked; measurement of 149 ppm taken 60 seconds after lid opened.

These results confirm that the MTM® material is effective for reducing volatilization of ammonia. This was chiefly evident on the last day of sampling when looking at the accumulated manure and litter in the ten-gallon pails, not only by gas monitoring, but by physical observation as well. Little ammonia smell was observed in the group A bucket on the last day of tests, but the ammonia in the group B bucket was very strong and gave off an almost overwhelming odor. These reductions in ammonia emission are believed to be a direct effect of the MTM® material controlling ammonia volatilization, and establishes that the MTM® material can survive the digestive tracts of poultry, remaining intact and effective.

Bird weights were variable for the first two weeks of the test, and then stabilized with no significant difference between the groups. This suggests that the MTM® material did not affect the uptake of nutrients by the birds and had no physical effects or ailments on development.

The bird weight data is set forth in the following Table 2, which gives the total of the group A and B bird weights on the indicated dates.

TABLE 2

| Day | Group A - gms | Group B - gms |
|---|---|---|
| 1 | 766.5 | 751.5 |
| 5 | 2032.5 | 1901.5 |
| 9 | 2859.5 | 2626.5 |
| 14 | 5560 | 5236 |
| 19 | 8938.5 | 8933.5 |
| 21 | 12031.5 | 12153.5 |
| 23[1] | — | — |
| 30 | 15382 | 15732 |
| 34[2] | — | — |
| 40 | 14985 | 15218 |

[1]Group A had a bird fatality, and accordingly one bird of the same sex was removed from group B
[2]Group A had two bird fatalities, and group B had 3 bird fatalities due to heat stress. A same sex bird was removed from group A A private veterinarian performed necropsies and sampled tissues for normality, finding two abnormalities on two birds in group A which could not definitively be attributed to the MTM® material. The veterinarian reported that a gross necropsy was performed on six chickens from the research group A, and two chickens from the control group B. The two chickens necropsied from the control group were chosen at random, one male and one female. No abnormal findings were noted in either of the chickens necropsied from the control group. Necropsies were performed on all six chickens from the research group. Gross abnormalities were noted in two of the research chickens, nos. 2 and 4. In no. 2, hepatic nodules and hepatic enlargement with rounded edges of the liver were noted. In both nos. 2 and 4, renal hyperplasia with blood engorgement was noted. The noted abnormalities could have been caused by a number of disease processes. Liver and kidney samples were submitted for histopathological examination from two of the control chickens that were necropsied, and three of the research chickens. In addition, blood was submitted for analysis. The analysis showed the presence of a parasitic inflammation, which confirmed that the MTM® product did not affect the physiology of the birds.

Example 2

Cattle

In this test, eight Angus cross-bred heifer calves were first fed and watered together for ten days prior to beginning the study, to ensure that all calves were in good health and were acclimated to their new environment. The animals had weights of 300-400 lbs after the end of the acclimation period, or at Day 0 of the test. The eight animals were randomly separated into two groups of four, with one group designated as the research group and the other designated as the control group. Both groups were placed in semi-ventilation control pens, each approximately 20 ×30 feet, within a metal building. All calves received free choice water and equal amounts of grass hay and a standard composite feed. The research group composite feed included MTM® at the rate of 0.25% (w/w), and the research group water was supplemented with MTM® at a rate of 0.25% (v/v). The control group animals received the same amounts of feed, hay, and water, without any MTM® supplementation. Both groups were fed their respective feeds and waters for 105 days.

Average daily weight gain was determined to understand what effect the copolymer amendment had on performance. Blood samples were also obtained for chemical analyses approximately every 30 days, in order to compare any differences between the control and research animals. Ammonia levels were randomly measured using a MiniRae 3000 photoionization detector. At the completion of the study, a randomly selected calf from each group was euthanized, and gross necropsies and tissue collections were performed.

Average Day 0 animal weights were 366.5 lbs for the control group and 352.5 lbs for the research group. Average Day 105 animal weights were 585.5 lbs for the control group, and 570 lbs for the research group. The average daily gain was determined by the total weight gained during the study, divided by 105 days. Average daily gain was 2.08 lbs/day for the control group, and 2.07 lbs/day for the research group. There was no statistically significant difference in average weight gain between the groups.

Blood was collected at approximately 30-day intervals and was submitted to the University of Missouri Diagnostic Laboratory for chemical analysis. The analyses included CGT, AST, direct bilirubin, total bilirubin, magnesium, phosphorus, calcium, globulin, total protein, albumin, anion gap, total $CO_2$, chloride, potassium, sodium, creatinine, and urea nitrogen. No statistically significant changes were noted between the groups based upon the chemical analyses.

Throughout the study, ammonia levels within the calf pens were taken using a photoionization detector (PID). Gas measurements were taken by placing the meter 20-30 cm off the pen floors at four random points within each pen. At each location, measurements were taken for 2.5 minutes, for a total measurement time of 10 minutes. During a testing period, an average gas measurement and a peak reading was determined; the peak readings were taken as the highest 10-second mean determined by the meter, whereas the average measurement was the 2.5 minute mean rating at each data collection point.

Test 1

| Point | Research Group | Average | Control Group | Average |
|---|---|---|---|---|
| 1 | 0.50 ppm NH3 | 0.14 ppm NH3 | 4.8 ppm NH3 | 1.7 ppm NH3 |
| 2 | 2.1 ppm NH3 | 0.46 ppm NH3 | 3.0 ppm NH3 | 0.58 ppm NH3 |
| 3 | 1.5 ppm NH3 | 0.91 ppm NH3 | 1.4 ppm NH3 | 0.88 ppm NH3 |
| 4 | 1.2 ppm NH3 | 0.97 ppm NH3 | 4.1 ppm NH3 | 2.4 ppm NH3 |
| Mean | 1.3 ppm NH3 | 0.62 ppm NH3 | 3.3 ppm NH3 | 1.4 ppm NH3 |

Test 2

| Point | Research Group | Average | Control Group | Average |
|---|---|---|---|---|
| 1 | 0.10 ppm NH3 | 0.03 ppm NH3 | 7.9 ppm NH3 | 2.6 ppm NH3 |
| 2 | 2.4 ppm NH3 | 0.74 ppm NH3 | 7.9 ppm NH3 | 3.7 ppm NH3 |
| 3 | 3.8 ppm NH3 | 1.6 ppm NH3 | 3.3 ppm NH3 | 1.9 ppm NH3 |
| 4 | 0.50 ppm NH3 | 0.24 ppm NH3 | 2.7 ppm NH3 | 1.2 ppm NH3 |
| Mean | 1.7 ppm NH3 | 0.65 ppm NH3 | 5.5 ppm NH3 | 2.4 ppm NH3 |

Test 3

| Point | Research Group | Average | Control Group | Average |
|---|---|---|---|---|
| 1 | 3.5 ppm NH3 | 1.2 ppm NH3 | 4.4 ppm NH3 | 1.2 ppm NH3 |
| 2 | 0.90 ppm NH3 | 0.23 ppm NH3 | 4.2 ppm NH3 | 2.2 ppm NH3 |
| 3 | 3.1 ppm NH3 | 0.60 ppm NH3 | 2.6 ppm NH3 | 1.4 ppm NH3 |
| 4 | 3.4 ppm NH3 | 1.6 ppm NH3 | 4.8 ppm NH3 | 2.2 ppm NH3 |
| Mean | 2.7 ppm NH3 | 0.91 ppm NH3 | 4.0 ppm NH3 | 1.8 ppm NH3 |

Test 4

| Point | Research Group | Average | Control Group | Average |
|---|---|---|---|---|
| 1 | 3.6 ppm NH3 | 1.0 ppm NH3 | 5.3 ppm NH3 | 1.9 ppm NH3 |
| 2 | 2.9 ppm NH3 | 0.86 ppm NH3 | 4.7 ppm NH3 | 3.5 ppm NH3 |
| 3 | 1.4 ppm NH3 | 0.27 ppm NH3 | 5.2 ppm NH3 | 1.7 ppm NH3 |
| 4 | 3.9 ppm NH3 | 1.6 ppm NH3 | 3.5 ppm NH3 | 1.9 ppm NH3 |
| Mean | 3.0 ppm NH3 | 0.93 ppm NH3 | 4.7 ppm NH3 | 2.3 ppm NH3 |

The test results confirmed that the use of the copolymers as feed and water amendments had no statistically significant effect on average daily weight gain or blood chemistry. However, the research group gave statistically significant reductions in ammonia levels, as compared with the control group.

The initial feed and water trial with MTM® confirmed that there was no detrimental short term impact on the health of these particular heifers when fed MTM® for 105 days at the rates mentioned previously. In order to determine any long-term effects that the MTM® treatment may have imparted, the remainder of the heifers in both the control and research groups were managed as replacement females on a forage-based diet without consuming any MTM®, and bred by artificial insemination and natural service.

At the end of the MTM® feed trial, the heifers were moved from a confinement feedlot setting to a pasture where they were managed as replacement heifers. The heifers received modified live pre-breeding vaccinations and dewormer. All females were artificially inseminated using a 7 day CIDR protocol, and, following artificial insemination, all heifers were placed with a bull for natural service of those that did not conceive with artificial insemination. The heifers remained with the bull for approximately 90 days. Approximately 45 days after removal of the bulls, ultrasound tests were used to determine whether the heifers had conceived via artificial insemination or natural service. In addition, ultrasound was performed on surrounding structures with no abnormal findings noted. It was determined that two heifers from the control group conceived via artificial insemination and two heifers from the research conceived via natural service. The remaining two heifers were determined to not be pregnant.

The heifers that were determined to not be pregnant, one from the control and one from the research group, were then maintained for breeding in the following spring. Both heifers were artificially inseminated using the same protocol as before and placed with a bull for 90 days. The bull was removed and both heifers were determined to have conceived via artificial insemination on ultrasound. These heifers have been ultra-sounded two times to insure that they are safe with calf and scheduled to calve.

The heifers that were determined to be pregnant initially were maintained on grass pasture, and were pregnancy-checked to determine that they were all still pregnant. The two control heifers that were artificially inseminated have both calved unassisted and are lactating normally as would be expected. The research heifers are scheduled to calve in the near future.

All heifers from both groups following the MTM® trial performed as expected and grew effectively when placed on a strictly pasture diet. No abnormalities were noted in any heifers throughout the monitoring period following the MTM® trial.

It was determined that feeding MTM® in a confinement feedlot setting for three months followed by removal of MTM® from the diet had no detrimental effect on the reproductive performance of the research group. The research group heifers have maintained themselves when placed on pasture and all have successfully conceived. The initial breeding of the heifers did have a higher than average open percentage, which is deemed to result from the immaturity of the females. Based upon the findings of this study, it is believed that the MTM® does not negatively impact the physiological health of the test cattle.

I claim:

1. A method of reducing volatilized ammonia derived from the excrement of animals, comprising the step of feeding the animals a feed product, said feed product comprising quantities of feed ingredients and an amount of a feed amendment including a partial calcium salt of a maleic-itaconic copolymer, and a partial ammonium salt of a maleic-itaconic copolymer, said amount of said amendment sufficient to reduce volatilized ammonia derived from the excrement of the animal fed the animal feed product.

2. The method of claim 1, including the step of adding said amendment to the feed consumed by the animals.

3. The method of claim 1, said animal feed being substantially dry, said amendment comprising an aqueous mixture of said copolymer salt intermixed with said feed ingredients.

4. The method of claim 3, said amendment comprising from about 30-60% by weight copolymer salt solids in an aqueous medium.

5. The method of claim 4, said aqueous mixture amendment being present with said feed at a level of from about 0.05-0.25% by weight, with the total weight of the amended feed being taken as 100% by weight.

6. The method of claim 5, said level being from about 0.1-0.2% by weight.

7. The method of claim 1, said amendment comprising from about 40-80% by weight of partial calcium salt copolymer solids, and from about 20-60% by weight of partial ammonium salt copolymer solids, with the total amount of the copolymer solids in the amendment taken as 100% by weight.

8. The method of claim 7, said amendment comprising from about 55-75% by weight of said partial calcium salt copolymer solids and from about 25-45% by weight of said partial ammonium salt copolymer.

9. The method of claim 1, each of said partial salt copolymers having at least about 85% by weight of maleic and itaconic moieties therein.

10. The method of claim 9, each of said partial salt copolymers having at least about 93% by weight of maleic and itaconic moieties therein.

11. The method of claim 10, each of said partial salt copolymers consisting essentially of maleic and itaconic moieties.

12. The method of claim 1, each of said partial salt copolymers being maleic-itaconic copolymers each comprising from about 10-90% maleic moieties and from 90-10% itaconic moieties.

13. The method of claim 12, each of said partial salt copolymers having substantially equimolar amounts of said maleic and itaconic moieties.

14. The method of claim 1, said copolymer also including sulfonate repeat units.

15. The method of claim 1, said feed ingredients including one or more of corn, soy, meat and bone meals, fats, limestone or oyster shell, amino acids, vitamin and mineral materials, and combinations thereof.

* * * * *